United States Patent
Pan et al.

(10) Patent No.: US 7,464,875 B2
(45) Date of Patent: Dec. 16, 2008

(54) IMAGE ACQUIRING APPARATUS CAPABLE OF PROCESSING IMAGE QUICKLY AND METHOD OF ACQUIRING IMAGE THEREOF

(75) Inventors: Meng-Wen Pan, Hsinchu (TW); Ming-Fu Hsu, Hsinchu (TW); Yih-Cheng Lee, Tainan (TW)

(73) Assignee: Avision Inc. (TW)

( * ) Notice: Subject to any disclaimer, the term of this patent is extended or adjusted under 35 U.S.C. 154(b) by 288 days.

(21) Appl. No.: 11/405,642

(22) Filed: Apr. 18, 2006

(65) Prior Publication Data
US 2006/0231626 A1 Oct. 19, 2006

(30) Foreign Application Priority Data
Apr. 18, 2005 (TW) .............................. 94112323 A

(51) Int. Cl.
*G06K 7/10* (2006.01)
(52) U.S. Cl. ...................................... 235/454; 235/456
(58) Field of Classification Search ................. 235/454, 235/456, 455, 492; 348/231.99, 207.99, 348/211.2; 358/1.15, 1.13, 1.18, 1.9
See application file for complete search history.

(56) References Cited

U.S. PATENT DOCUMENTS

| | | | | |
|---|---|---|---|---|
| 6,856,427 B1 * | 2/2005 | Gilman et al. | ................ | 358/1.9 |
| 6,869,156 B2 * | 3/2005 | Inoue et al. | ..................... | 347/5 |
| 7,010,176 B2 * | 3/2006 | Kusunoki | ................... | 382/299 |
| 7,154,621 B2 * | 12/2006 | Rodriguez et al. | ......... | 358/1.15 |
| 7,265,780 B2 * | 9/2007 | Tanaka et al. | ........... | 348/207.99 |
| 2002/0048413 A1 * | 4/2002 | Kusunoki | ................... | 382/282 |
| 2004/0036903 A1 * | 2/2004 | Azami | ....................... | 358/1.13 |
| 2004/0179046 A1 * | 9/2004 | Inoue et al. | ..................... | 347/3 |
| 2005/0122411 A1 * | 6/2005 | Inoue et al. | ............ | 348/231.99 |
| 2006/0088284 A1 * | 4/2006 | Shen et al. | .................... | 386/52 |

* cited by examiner

*Primary Examiner*—Thien M Le

(57) ABSTRACT

An image acquiring apparatus capable of processing an image quickly and a method of acquiring the image. The image acquiring apparatus includes an image acquiring unit and a processing unit. The image acquiring unit acquires a source image, converts the source image into a first image data and then outputs the first image data. The processing unit produces a second image data according to the first image data and produces an image parameter according to the second image data. The image parameter executes an image correcting procedure. The size of the second image data is less than the size of the first image data.

21 Claims, 5 Drawing Sheets

IMAGE ACQUIRING APPARATUS CAPABLE OF PROCESSING IMAGE QUICKLY AND METHOD OF ACQUIRING IMAGE THEREOF

This application claims the benefit of Taiwan application Serial No. 94112323, filed Apr. 18, 2005, the subject matter of which is incorporated herein by reference.

BACKGROUND OF THE INVENTION

1. Field of the Invention

The invention relates in general to an image acquiring apparatus, and more particularly to an image acquiring apparatus capable of quickly processing an image.

2. Description of the Related Art

FIG. 1 is a block diagram showing a conventional image acquiring apparatus. Referring to FIG. 1, an image acquiring apparatus 100 includes an image acquiring unit 110, a processing unit 120 and a memory unit 130. The image acquiring unit 110 acquires a source image S0, converts the source image S0 into an image data D1 and then outputs the image data D1. The processing unit 120 produces an image data D2 according to the image data D1 while storing the image data D1 into the memory unit 130. The image data D2 is produced by modifying the data format of the image data D1.

In order to meet the user's demands or correct the defects due to capturing the image, such as the inclination of the acquired image, setting the size of the original document, changing or filtering the background color, the brightness and the resolution, the using demand of the image, and so on. The image data D1 has to be analyzed and computed to obtain the above-mentioned image acquiring parameters, such as the skew detection parameter, the page size parameter, the leading edge and trailing parameter, the brightness and resolution control parameter, the background filtering and filling parameter, the compression method selection parameter, and the like, such that the image data D1 may be adjusted.

However, the size of the image data D2 is very large. For instance, when an A4-size document is acquired to obtain the source image S0 in a black-and-white mode and with a resolution of 600 dpi, the size of the produced image data D1 may be several hundreds of KBytes. If the acquired source image S0 is acquired in a color mode and with the same resolution as that described hereinabove, the size of the produced image data D1 may reach several MBytes.

Thus, computing and analyzing the large image data D1 to obtain the image parameter P1 have to be utilized a high-level processor and a large-capacity memory of a computer host 140. If the image acquiring apparatus 100 has to analyze and compute the image data to obtain the image parameter P1, the apparatus 100 has to be equipped with the data processing hardware having the powerful processing function, which is the same as that of a computer host 140, and the manufacturing cost will be increased greatly.

SUMMARY OF THE INVENTION

It is therefore an object of the invention to provide an image acquiring apparatus capable of quickly processing an image and a method of processing the image. Converting the image data into a thumbnail image enables the image acquiring apparatus to quickly compute and analyze the image parameter to correct the image data.

The invention achieves the above-identified object by providing an image acquiring apparatus capable of quickly processing an image. The image acquiring apparatus includes an image acquiring unit and a processing unit. The image acquiring unit acquires a source image, converts the source image into a first image data, and then outputs the first image data. The processing unit produces a second image data according to the first image data, and produces an image parameter according to the second image data. The size of the second image data is lower than the size of the first image data.

The invention also achieves the above-identified object by providing a method of acquiring an image and quickly processing the image in an image acquiring apparatus. First, a source image is acquired and then converted into a first image data. Next, a second image data is produced according to the first image data, wherein the size of the second image data is smaller than the size of the first image data. Finally, an image parameter is produced according to the second image data.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
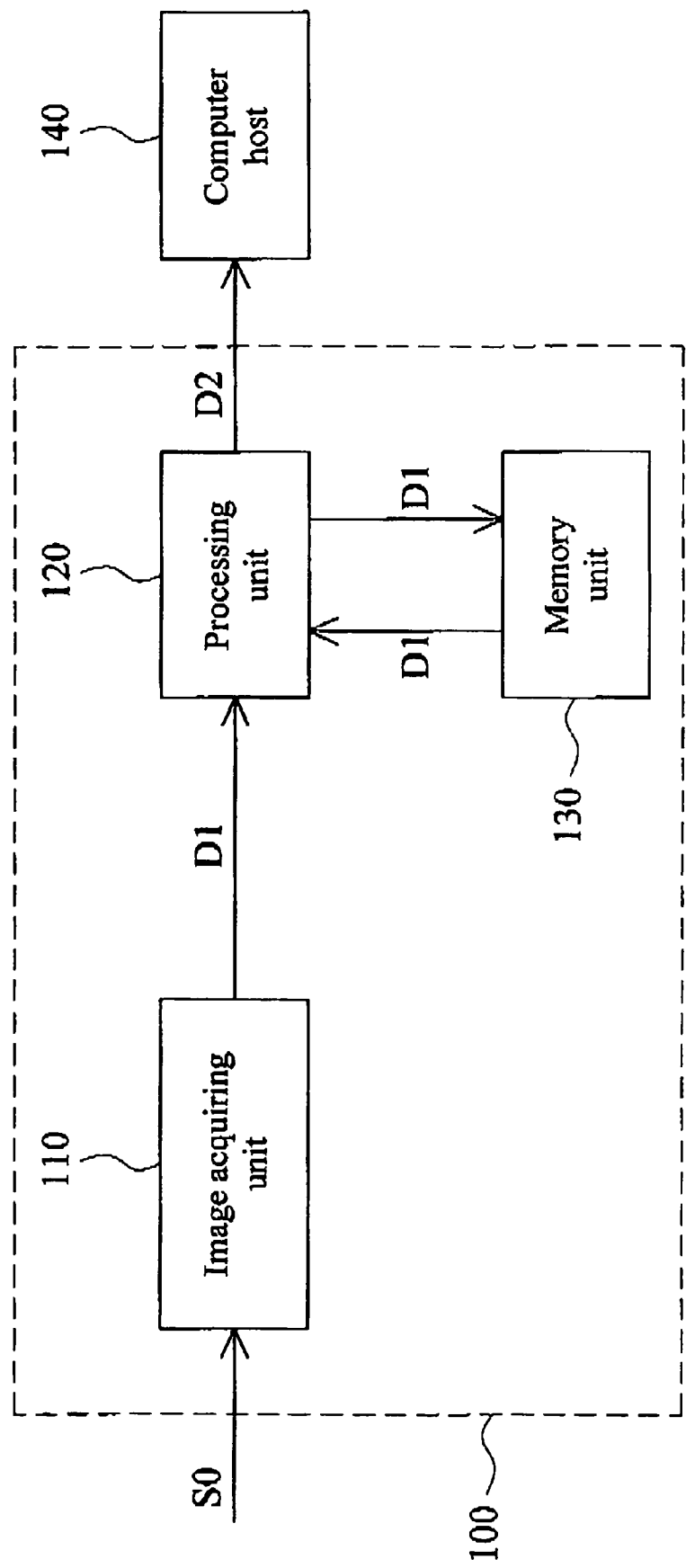
FIG. 1 is a block diagram showing a conventional image acquiring apparatus.
Figure 2:
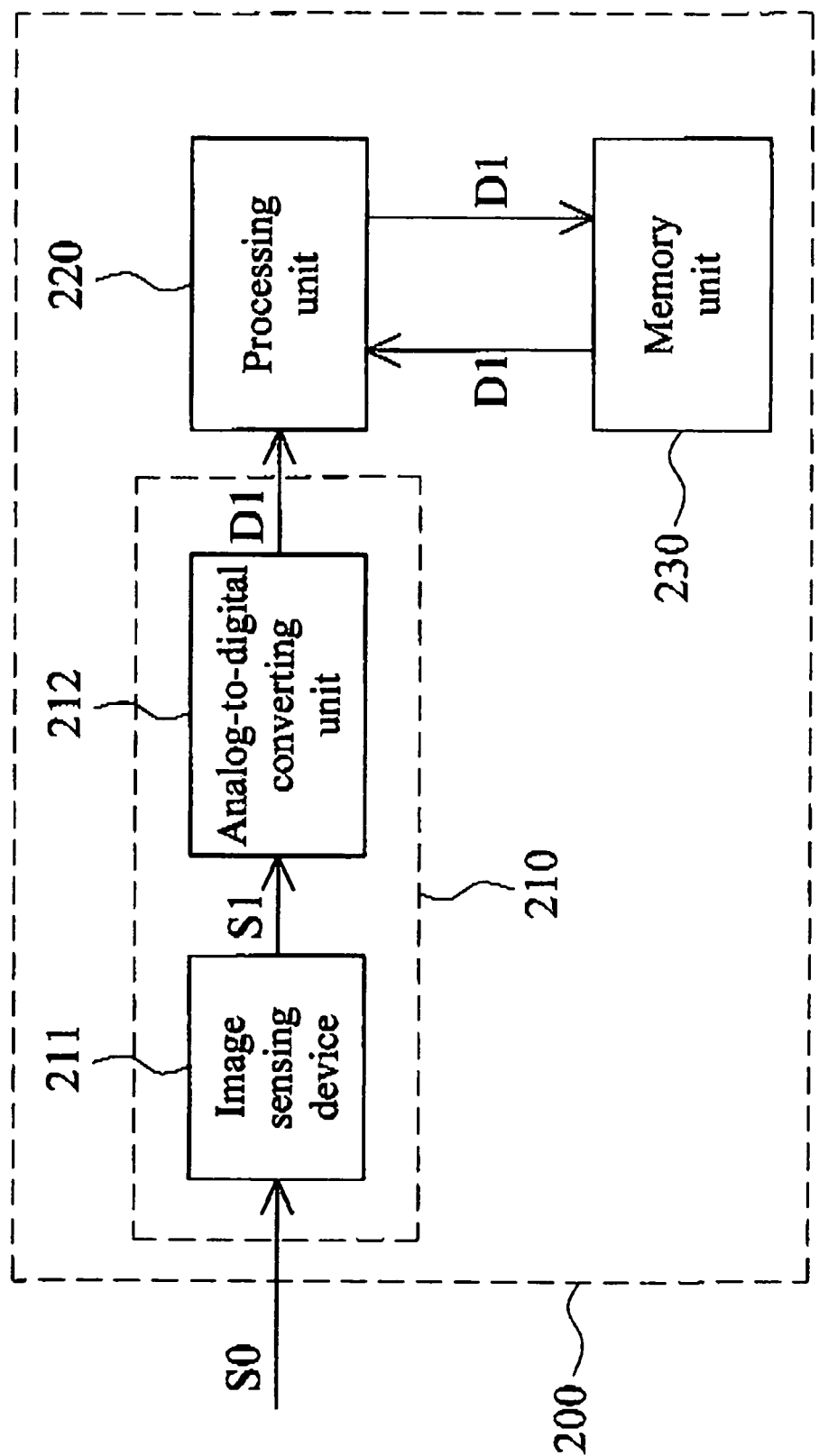
FIG. 2 shows an image acquiring apparatus capable of processing an image quickly according to a preferred embodiment of the invention.

FIG. 2 shows an image acquiring apparatus capable of processing an image quickly according to a preferred embodiment of the invention. Referring to FIG. 2, an image acquiring apparatus 200 includes an image acquiring unit 210, a processing unit 220 and a memory unit 230. The image acquiring unit 210 acquires a source image S0, converts the source image S0 into an image data D1, and then outputs the image data D1. The processing unit 220 may be an application specific integrated circuit (ASIC). The processing unit 220 stores the image data D1 into the memory unit 230 and produces the image data D3 (not shown in the drawing) according to the image data D1. The size of the image data D3 is smaller than the size of the image data D1. The processing unit 220 produces an image parameter P2, which is used in an image correcting mode, according to the image data D3.

In detail, the image acquiring unit 210 includes an image sensing component 211 and an analog-to-digital converter 212. The image sensing component 211 acquires the source image S0 to produce an electric charge signal S1. The analog-to-digital converter 212 converts the electric charge signal S1 into the image data D1 and then outputs the image data D1. The image data D1 is a digital signal. The processing unit 220 produces the image data D3 according to the image data D1. In this embodiment, the resolution of the image data D3 is also smaller than the resolution of the image data D1. The image data D3 may be, for example, a preview image or a thumbnail image. For example, the processing unit 220 compresses the image data D1 of an A4-size document into the image data D3, the resolution of the second image data D2 is about 72 dpi, and the size of several hundreds of KBytes before compression is reduced to about 100 KBytes to 150 Kbytes. The size reduction enables the processing unit 220 to quickly compute and analyze the image data D3 to produce the image parameter P2, which includes the skew detection parameter, the page size parameter, the leading edge and trailing parameter, the brightness and resolution control parameter, the background filtering and filling parameter and the compression method selection parameter. It is possible to get the skew of the placed original document, the image size, the leading edge and the trailing edge, the image brightness and resolution and the image background modification, and to select different compression methods according to different requirements and the above-mentioned parameters.

After the processing unit 220 has produced the image parameter P2 according to the image data D3, many subsequent processing methods can be used. For example, the processing unit 220 can correct the image data D1 to produce the image data D4 for output according to the image parameter P2. The processing unit 220 may also output the image parameter P2 and the image data D1 directly without the correcting operation.

Figure 3:
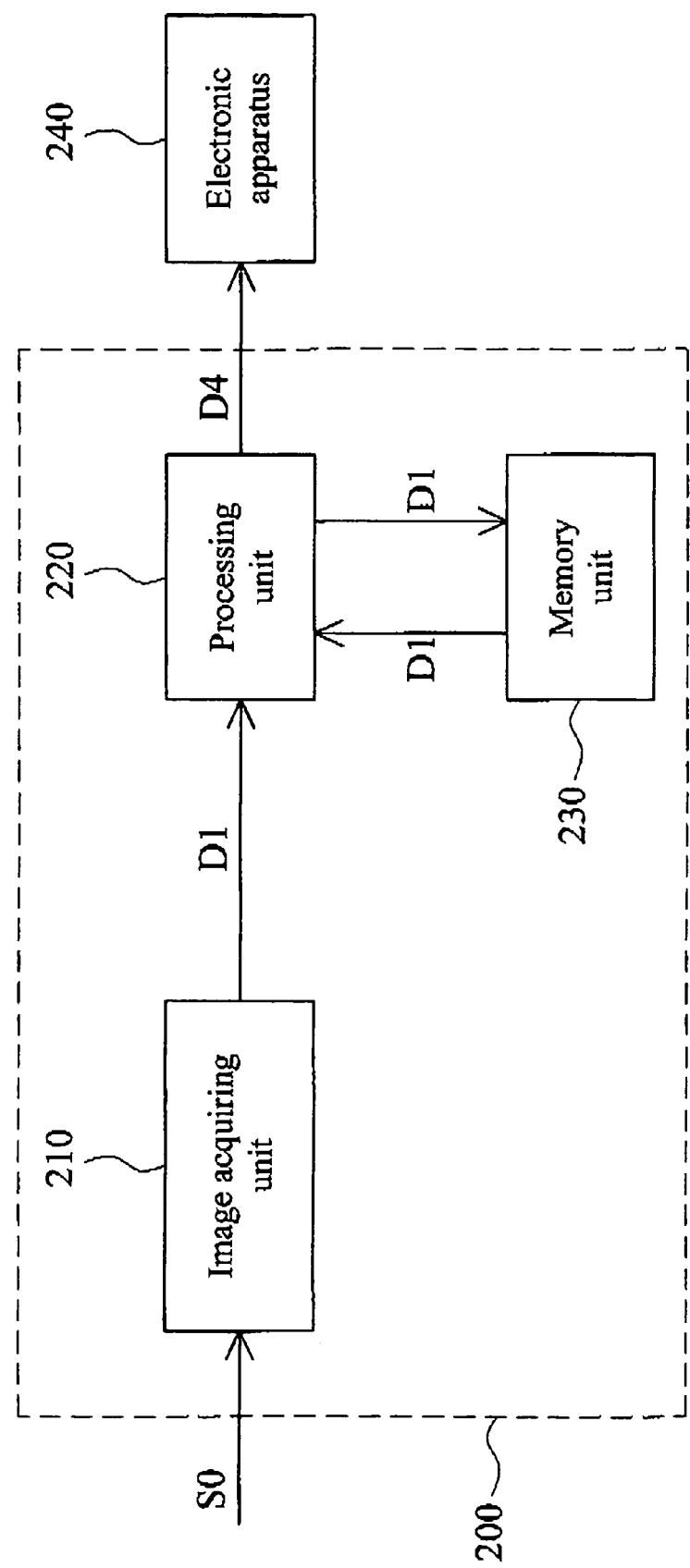
FIG. 3 is a block diagram showing the image acquiring apparatus of the invention, which is externally connected to an electronic apparatus.

If the image acquiring apparatus 200 wants to output the image data D4 directly, the image data D4 is output to an electronic apparatus. For example, FIG. 3 is a block diagram showing the image acquiring apparatus of the invention, which is externally connected to an electronic apparatus. The electronic apparatus 240 receives the image data D4, and the electronic apparatus 240 may have the following aspects to achieve different applications.

When the electronic apparatus 240 is a printing apparatus, the image acquiring apparatus 200 electrically connected to the printing apparatus can directly output the image data D4, which has better quality after correcting, to the printing apparatus. The printing apparatus may further print the image data D4. In addition, it is also possible to integrate the printing apparatus with the image acquiring apparatus 200 to form a multi-function peripheral. When the electronic apparatus 240 is a faxing apparatus, the image acquiring apparatus 200 electrically connected to the faxing apparatus directly outputs the image data D4, which has better image quality after correcting, to the faxing apparatus. The faxing apparatus may fax the image data D4 out.

When the electronic apparatus 240 is an Internet apparatus, the image acquiring apparatus 200 electrically connected to the Internet apparatus directly transmits the image data D4, which has better quality after correcting, to the Internet apparatus. Then, the Internet apparatus processes the image data D4 into an image file and uploads the image file to the network. Alternatively, when the electronic apparatus 240 is a computer host, the image acquiring apparatus 200 corrects the image data D1 according to the image parameter P2 and then produces the image data D4, and directly outputs the image data D4, which has better quality, to the computer host.

Figure 4:
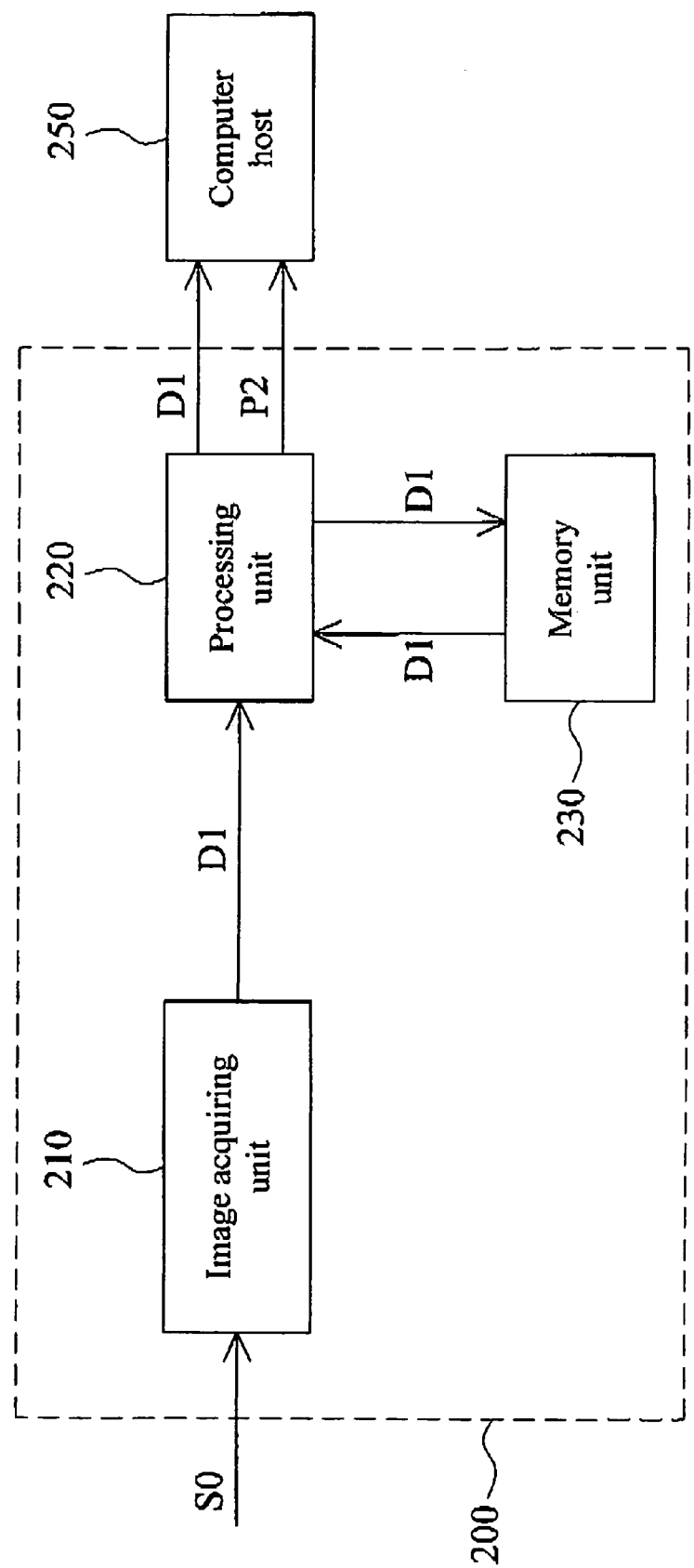
FIG. 4 is a block diagram showing the image acquiring apparatus of the invention, which is externally connected to a computer host.

In addition, the image acquiring apparatus 200 may also output the image parameter P2 and the image data D1 to the computer host, which corrects the image data D1 according to the image parameter P2. For example, FIG. 4 is a block diagram showing the image acquiring apparatus of the invention, which is externally connected to a computer host. When the image acquiring apparatus 200 outputs the image parameter P2 and the image data D1 to the computer host 250, the computer host 250 can correct the image data D1 to produce the image data D5 (not shown) according to the image parameter P2.

Figure 5:
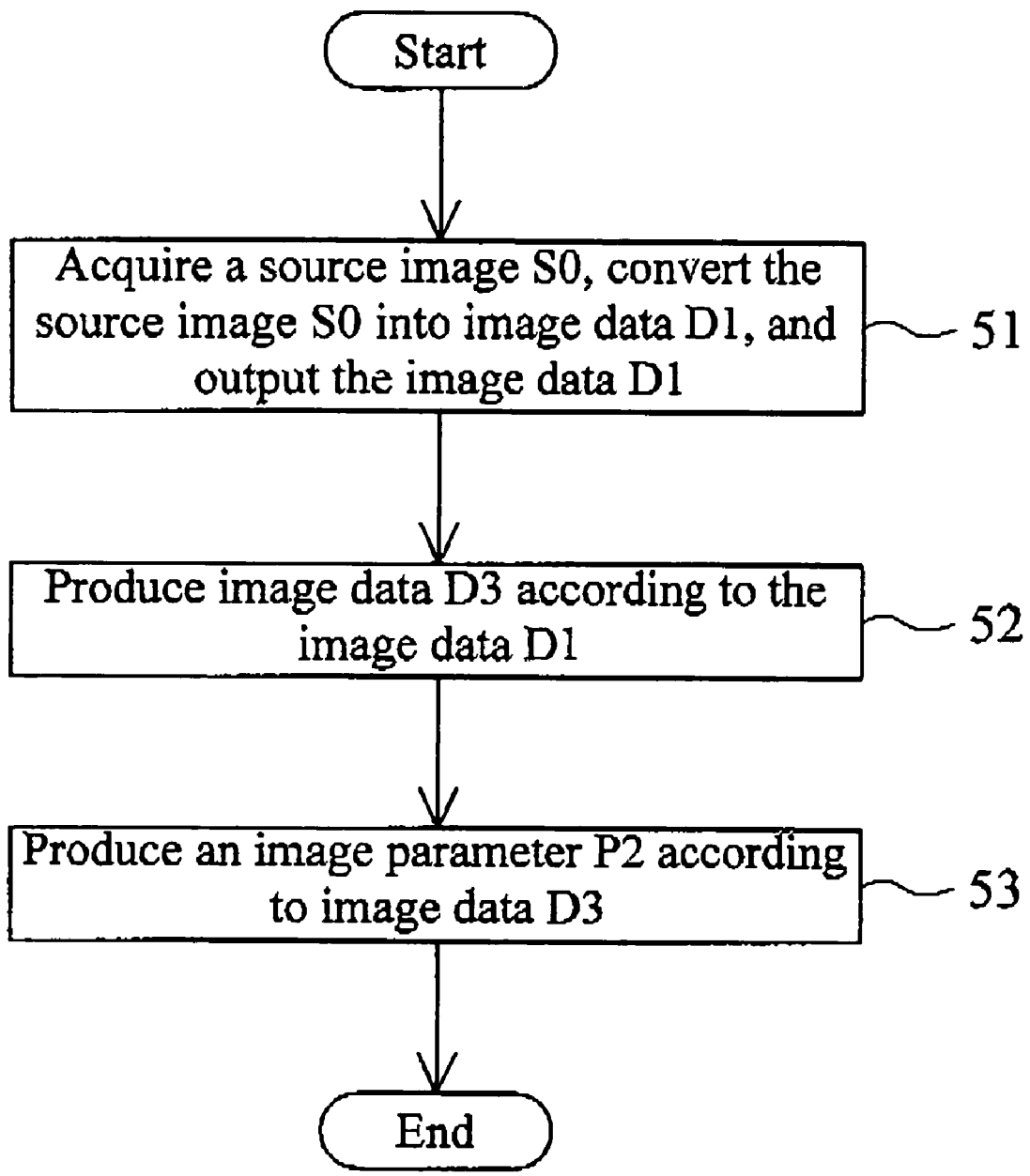
FIG. 5 is a flow chart showing a method of acquiring an image and quickly processing the image according to a preferred embodiment of the invention.

FIG. 5 is a flow chart-showing a method of acquiring an image and quickly processing the image according to a preferred embodiment of the invention. The image acquire method is used in the image acquiring apparatus 200 and includes four steps. First, step 51 acquires a source image S0, converts the source image into the image data D1, and then outputs the image data D1. Next, step 52 produces the image data D3 according to the image data D1, wherein the size of the image data D3 is smaller than that of the image data D1. Finally, step 53 produces an image parameter P2 according to the image data D3.

In the image acquiring apparatus and the image acquire method of quickly processing an image according to the embodiments of the invention, reducing the size and resolution of the image data enables the image acquiring apparatus to quickly compute and analyze the image parameter to correct the image data without being equipped with the data processing hardware having the same processing function as that of the computer host.

In addition, the image acquiring apparatus of this embodiment can further execute an image correcting procedure according to the image parameter, such that the corrected image data can be directly transferred to a printing apparatus, a faxing apparatus, an Internet apparatus, or the like, and then the corrected image data can be outputted in a format according to the user's requirements.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image acquiring apparatus, comprising:
    an image acquiring unit for acquiring a source image, converting the source image into first image data and outputting the first image data; and
    a processing unit for processing the first image data to produce second image data, and processing the second image data to obtain an image parameter of the second image data, wherein the second image data has a size and a resolution that are less than those of the first image data in order to facilitate quick production of the image parameter, wherein;
    in an image correcting mode of the image acquiring apparatus, the processing unit corrects the first image data with reference to the image parameter of the second image data to produce third image data corresponding to the corrected first image data.

2. The apparatus according to claim 1, wherein the image acquiring apparatus is electrically connected to a computer host, the processing unit outputs the first image data and the image parameter of the second image data to the computer host without outputting the second image data to the computer host, and the computer host corrects the first image data with reference to the image parameter of the second image data.

3. The apparatus according to claim 1, wherein the second image data is a preview image.

4. The apparatus according to claim 1, wherein the second image data is a thumbnail image.

5. The apparatus according to claim 1, wherein the image acquiring unit comprises:
    an image sensing component for acquiring the source image to produce an electric charge signal; and an analog-to-digital converter for converting the electric charge signal into the first image data and then outputting the first image data, wherein the first image data is a digital signal.

6. The apparatus according to claim 1, wherein the processing unit is an application specific integrated circuit (ASIC).

7. The apparatus according to claim 1, wherein the image parameter comprises a skew detection parameter, an page size parameter, an leading edge and trailing parameter, a brightness and resolution control parameter, a background filtering and filling parameter and a compression method selection parameter.

8. The apparatus according to claim 1, wherein the image acquiring apparatus is electrically connected to a printing apparatus, which prints the third image data.

9. The apparatus according to claim 1, wherein the image acquiring apparatus is electrically connected to a computer host, and the processing unit outputs the third image data to the computer host.

10. The apparatus according to claim 1, wherein the image acquiring apparatus outputs the third image data through the Internet.

11. The apparatus according to claim 1, wherein the image acquiring apparatus outputs the third image data by the way of faxing.

12. A method of acquiring an image in an image acquiring apparatus, the method comprising the steps of:
  acquiring a source image and converting the source image into first image data;
  by using a processing unit of the image acquiring apparatus:
    processing the first image data to produce second image data;
    processing the second image data to obtain an image parameter of the second image data, wherein the second image data has size and a resolution that are smaller than those of the first image data in order to facilitate quick production of the image parameter; and
    correcting the first image data with reference to the image parameter of the second image data to produce third image data corresponding to the corrected first image data.

13. The method according to claim 12, wherein the second image data is a preview image.

14. The method according to claim 12, wherein the second image data is a thumbnail image.

15. The method according to claim 12, wherein the image parameter comprises a skew detection parameter, a page size parameter, a leading edge and trailing parameter, a brightness and resolution control parameter, a background filtering and filling parameter and a compression method selection parameter.

16. The method according to claim 12, further comprising the step of outputting the first image data and the image parameter.

17. The method according to claim 12, further comprising the step of outputting the third image data.

18. A multi-function peripheral apparatus, comprising:
  an image acquiring unit configured to acquire a source image of at least a page, converting the source image into first image data and outputting the first image data; and
  a processing unit configured to process the first image data to produce second image data, and to process the second image data to obtain an image parameter of the second image data;
    wherein the second image data has a size and a resolution that are less than those of the first image data in order to facilitate quick production of the image parameter;
    wherein in an image correcting mode of the multi-function peripheral apparatus, the processing unit corrects the first image data with reference to the image parameter of the second image data to produce third image data corresponding to the corrected first image data; and
  a printing unit for selectively printing the third image data;
  wherein the multi-function peripheral apparatus is a single peripheral.

19. The multi-function peripheral apparatus according to claim 18, further comprising a faxing unit configured selectively to fax out the third image data.

20. The multi-function peripheral apparatus according to claim 18, further comprising a unit configured selectively to upload the third image data to a network.

21. The multi-function peripheral apparatus according to claim 18, wherein the image parameter includes at least one of a skew detection parameter, a page size parameter, a leading edge and trailing parameter, a brightness and resolution control parameter, a background filtering and filling parameter and a compression method selection parameter.

* * * * *